Nov. 2, 1943.    O. R. HUGGINS    2,333,251
METHOD OF AND MEANS FOR REPRODUCING DESIGNS
Filed May 21, 1941    3 Sheets-Sheet 1

INVENTOR
BY Owen R. Huggins
Frank G. Braham ATTORNEY

Nov. 2, 1943.    O. R. HUGGINS    2,333,251
METHOD OF AND MEANS FOR REPRODUCING DESIGNS
Filed May 21, 1941    3 Sheets-Sheet 2

INVENTOR
BY *Owen R. Huggins*
*Frank G. Braham* ATTORNEY

Nov. 2, 1943.  O. R. HUGGINS  2,333,251
METHOD OF AND MEANS FOR REPRODUCING DESIGNS
Filed May 21, 1941  3 Sheets-Sheet 3

INVENTOR
Owen R. Huggins
BY
Frank G. Braham ATTORNEY

Patented Nov. 2, 1943

2,333,251

UNITED STATES PATENT OFFICE 2,333,251

METHOD OF AND MEANS FOR REPRODUCING DESIGNS

Owen R. Huggins, South Norwalk, Conn., assignor to Linotone Corporation, a corporation of New York Application May 21, 1941, Serial No. 394,492

5 Claims. (Cl. 41—43)

This invention relates to the art of making graduated instruments, and especially to methods of producing the markings such as lines and figures which appear thereon.

An example of the usefulness of the present invention is found in the manufacture of range drums used on anti-aircraft guns. Such drums are provided with a spiral groove having a plurality of lines and figures formed along one edge thereof, the lines being provided to translate the elevation of the gun in terms of the number of yards a projectile fired therefrom will travel, and the figures being provided to enable the operator to more readily locate a desired line in operative position. In addition, the surface of the drum and the markings formed thereon are usually painted in contrasting colors to aid the operator in bringing a desired line in operative position. In such instruments, the lines and figures must be located with a degree of accuracy which is difficult of attainment with present methods by virtue of the fact that each marking is scribed as a separate operation by means of a machine which requires as another operation a resetting of the machine for each marking. Aside from the fact that the degree of accuracy required is difficult of attainment by present methods they are open to the objection that the markings created thereby on one instrument seldom if ever corresponded exactly to the markings on another instrument. Also, since each marking was created as a separate operation, each marking had to be inspected to make certain it bore the desired relationship with respect to the other markings along the groove. In addition, the markings being scribed, the walls thereof offered little resistance to the removal of the contrasting paint with the result that in most cases it soon chipped off after the instrument had been put in use.

In accordance with the present invention there is provided a method of producing the markings on such instruments wherein all the above as well as other difficulties are obviated. To these ends, a die is created photomechanically having reproductions of the markings that are to be produced on the instruments. These reproductions are preferably created in relief, and the linear distances between them equals exactly the linear distances it is desired to have the corresponding markings spaced on the finished instruments. Thereafter, the instrument blanks, after being coated with a suitable resist, are applied one after another against the relief reproductions on the die to cause these reproductions to cut through or otherwise displace the resist coating and so bare the underlying areas on the blanks. Then the blanks are subjected to the action of an etchant to etch out the areas on the blanks thus bared and so produce the desired markings in intaglio on the blanks; and finally the blanks are washed to remove the remaining areas of the resist coating.

Inasmuch as the markings are produced on the blanks by means of a die, the only requirement necessary to insure that the markings on one instrument correspond with the markings on another is that the blanks be duplicates of one another, and this, of course, is a simple requirement in view of the present day finishing machines. Also, since the markings are produced on the blanks by means of a die, it is only necessary to inspect one or at the most a few of the markings instead of them all to insure that they occupy their intended positions on the instruments. In addition, the markings, being etched out, offer greater resistance to the removal therefrom of the contrasting paint.

For a more complete description of the invention reference may be made to the accompanying drawings wherein.

In describing the invention, a range drum has been chosen for purposes of illustration. Such drums are made from blanks 20 cut from tubular stock and are provided with a spiral groove 21 having markings 22 formed along one edge thereof.

Figure 1:
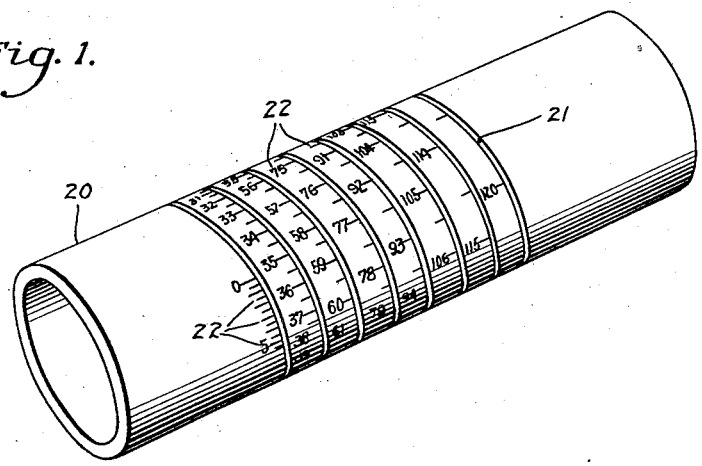
Figure 1 is a perspective view of a range drum having markings such as lines and numbers located along a spiral groove.
Figure 2:
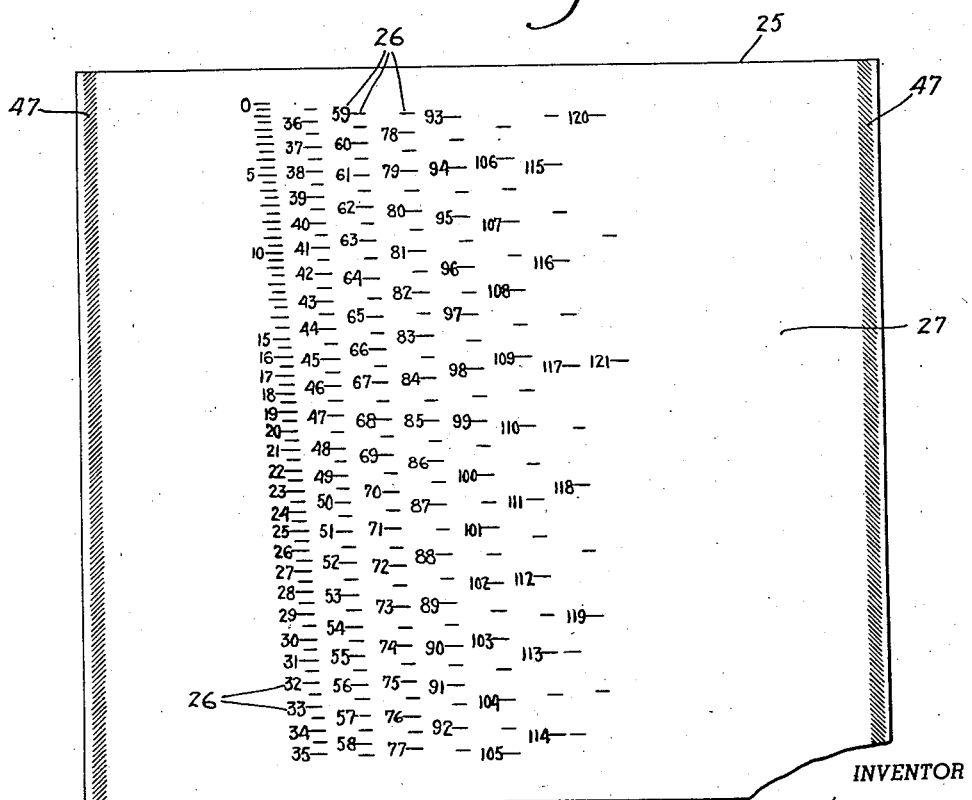
Figure 2 is a plan view of a flat copy showing black on white reproductions of the markings to be formed along the groove.
Figure 5:
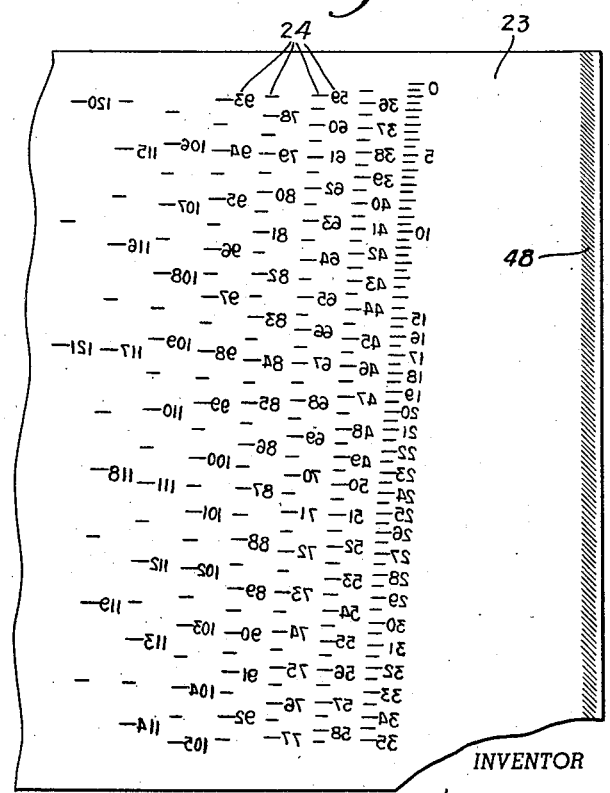
Figure 5 is a plan view of a flat die.

In accordance with the preferred embodiment of the invention, the markings 22 are formed on the blanks 20 before the groove 21 is cut, the reason for this being explained later. In forming the markings 22 on the blank 20, a flat die 23 is created photomechanically having reproductions 24 of the markings 22 preferably in relief and in such a manner that the linear distances between the reproductions are exactly the same as it is desired to have the corresponding markings spaced along the groove 21 on the finished drums (see Fig. 5). To this end, a flat photographic copy 25 is made by hand having non-light reflecting reproductions 26 of the markings 22 on a light reflecting background 27 (see Fig. 2). The copy 25, in effect, comprises a development of the markings 22 as they are to appear on the instruments, and it is preferably made oversize since this leads to greater accuracy in preparing the copy.

Figure 3:
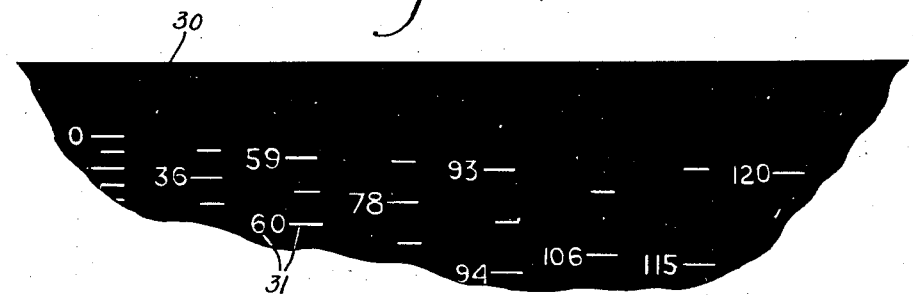
Figure 3 is an enlarged plan view of a portion of the negative of the copy.
Figure 4:
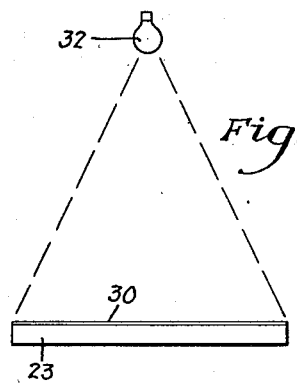
Figure 4 is a schematic view showing the arrangement employed in defining the areas to be etched on the die.

After the copy 25 has been prepared, it is mounted on the copy board 28 of a camera 29, and a light sensitive film or plate 30 in the camera 29 is exposed thereto. The film or plate 30 is then removed from the camera 29 and developed. The resultant negative 30 will be substantially opaque save for transparent areas 31 which correspond to the non-light reflecting reproductions 26 of the markings on the copy 25 (see Fig. 3). Prior to the exposure of the film or plate, however, the camera 29 is carefully focused to make certain that the linear distances between the transparent areas or reproductions 31 on the negative 30 are exactly the same as the linear distances it is desired that the corresponding markings be spaced along the groove 21 on the finished instruments.

The negative 30 thus prepared is then placed in intimate contact with a light sensitive coating applied on the surface of a flat metal plate 23 and light from any suitable source, such as a lamp 32, is directed through the transparent areas 31 on to the underlying areas of the light sensitive coating on the plate 23. The negative 30 is then removed, and the coating on the plate 23 developed to render resistant those areas 24 affected by light and which constitute reproductions of the markings it is desired to produce on the finished instruments. The plate 23 is then washed to remove the unexposed portions of the coating and thus bare the underlying areas of the plate 23; and finally, the plate 23 is subjected to the action of acid to etch away those areas thus bared. During this etching operation, those areas 24 protected by the resist and which, as stated heretofore, constitute reproductions of the markings to be formed along the groove 21 on the finished drums remain substantially unaffected. Thus the plate 23 is converted into a die having reproductions 24 in relief of the markings to be produced, and the linear distances between these markings are exactly the same as the linear distances it is desired to have the corresponding markings spaced along the groove 21 on the finished instruments.

Figure 6:
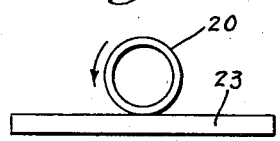
Figure 6 is a schematic view showing the manner in which the areas to be etched on the drums are defined with the aid of the die.
Figure 7:
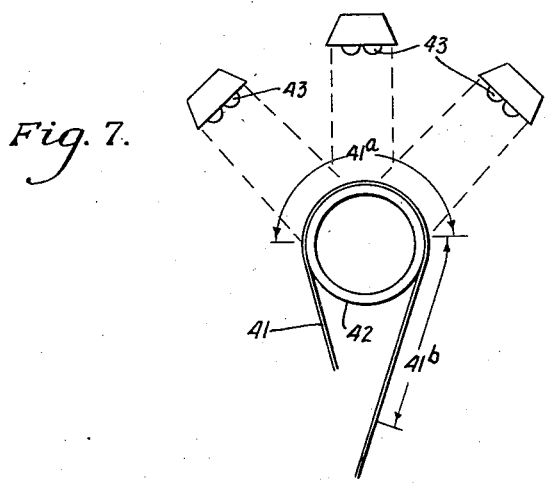
Figure 7 is a schematic view of a modified arrangement employed in the creation of a roller die.
Figure 8:
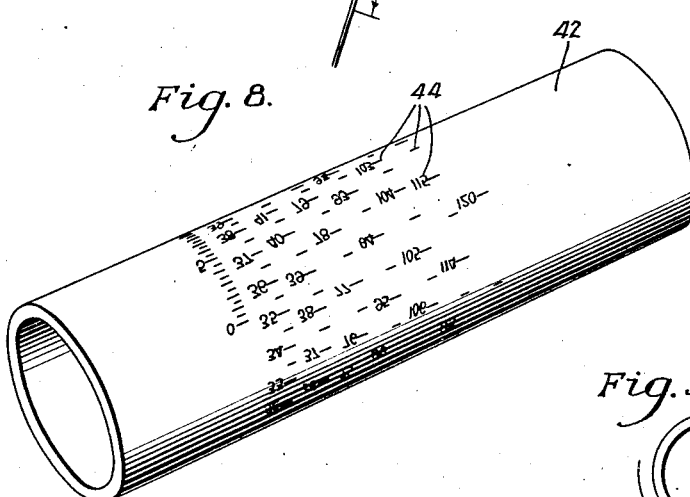
Figure 8 is a perspective view of a roller die.

The die 23 thus made is then clamped to a table (not shown) capable of being reciprocated back and forth in a fixed path, and a blank 20 to be etched, after being machine finished to substantially the exact diameter required and coated with a suitable resist, is rotatably mounted above the die 23. Then the blank 20 is brought into engagement with the die 23 and the die 23 moved therebeneath (see Fig. 6) from one end of the reproduction thereon to the other during which time the blank 20 makes one complete turn.

As the die 23 travels beneath the blank 20, the relief reproductions 24 cut through or otherwise displace the resist and so bare the underlying areas on the blank 20, thus creating reproductions of the markings 22 on the blank 20 in the form of etchable areas and in the exact location it is desired the markings occupy along the groove 21. Thereafter, the blank 20 is subjected to the action of acid to etch out the reproductions thus created and so form, as engravings, the desired markings 22 on the blank 20.

As stated heretofore, the groove 21 is formed after the markings 22 have been formed on the blank, this being desirable since otherwise difficulty might be experienced in obtaining a coating of even thickness on the blanks. Also, the groove 21 is preferably formed mechanically, and since the machines for so forming a groove of this type are well known in the art no description thereof is deemed necessary. After the groove 21 and markings 22 are formed they are usually rendered contrasting in appearance as by painting the markings 22 white and the remainder of the engraved surface black.

As previously stated, since the markings 22 are produced on the blanks 20 by means of a die, the only requirement necessary to insure that the markings 22 on one instrument are substantial duplicates of the markings 22 on another instrument is that the blanks 20 be machine finished to substantially the same diameter. Also, since the markings 22 are produced on the blanks 20 by means of a die, it is only necessary to inspect one or at the most a few of the markings 22 to insure they all occupy their intended position along the groove 21. As a matter of fact, the die 23 may be provided with means (not shown) for forming inspection marks on the blanks 20 at the same time the reproductions of the markings 22 are formed thereon. Under such conditions, the inspection marks could be checked or inspected for accuracy and then painted out or otherwise protected against the action of acid before the etching operation so that they would not appear on the finished instrument. In addition, the markings 22 thus created on the instruments, being etched, have slightly pitted side and bottom walls which serve to hold the contrasting paint. Also, during the etching out of the markings 22, the edge of the resist coating which defines the areas to be etched becomes slightly undercut and so folds downwardly and protects the upper edges of the side walls of the markings against the action of acid with the result that a shoulder (not shown) which serves to retain the paint is formed about the upper edges of the markings 22.

In accordance with another embodiment of the invention, a roller die is used in place of the flat die 23 described above. In marking the roller die, the black on white copy 25 is photograped onto a flexible film 41 which is then developed to create a negative all in the manner described heretofore. The flexible negative 41 is then trained over a roller blank 42 coated with a light sensitive substance, and one-half the image area 41a as measured from one end thereof is brought into intimate contact with the light sensitive coating. Thereafter, light from any suitable source such as that created by lamps 43, is directed through the transparent areas of that one-half portion of the negative in contact with the light sensitive coating on the roller onto those portions of the coating underlying the same. Then the remaining half of the image area 41b of the negative 41 is brought into intimate contact with the other half of the sensitized surface of the roller and light is projected through the transparent areas thereof onto the underlying areas of the sensitized coating. Prior to this second exposure, care must be exercised to make certain that the end of the reproduction created on the sensitized surface of the blank 42 during the first exposure joins with the end of the second half of the image area or the negative 41, otherwise the reproductions of the markings created during the second exposure will not bear the intended relationship with the reproductions of the markings created during the first exposure. After the second exposure, the light sensitive coating on the blank 42 is developed to render the light affected areas resistant to the action of acid Then the blank 42 is washed to remove the remaining unexposed areas of the sensitized coating; and finally it is subjected to the action of acid to etch away those portions bared by the removal of the light unaffected areas of the coating. Thus the blank 42 is converted into a roller die having reproductions 44 in relief of the markings to be produced on the instruments.

Figure 9:
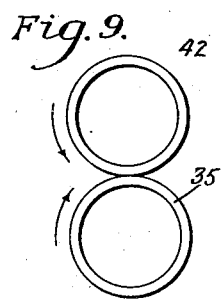
Figure 9 is a schematic view of the arrangement employed to define the areas to be etched on the drum with the aid of the roller die.
Figure 10:
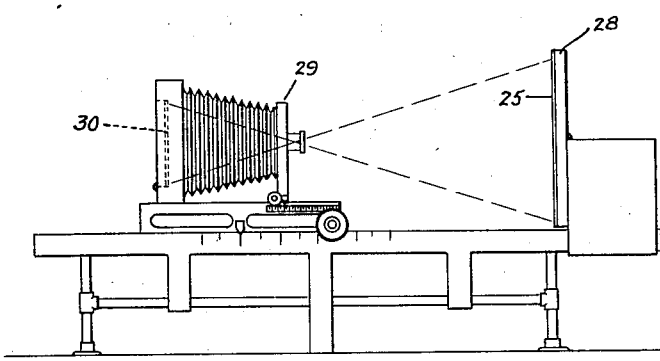
Figure 10 is a side elevation of apparatus employed in creating a negative.

The roller die 42 thus created may then be rotatably mounted, and the instrument blanks 20 after being coated with an acid resist brought into rolling engagement therewith one after another (see Fig. 9). During this rolling engagement, the relief reproductions 44 on the die 42 cut through or otherwise displace the coating and so bare the underlying areas on the blanks 20. Thereafter, the blanks 20 are subjected to the action of acid to etch out the areas thus bared and so form the markings 22 in the form of engravings.

In either embodiment the coating of resist may, if desired, be omitted from the blanks 20 before they are applied to the die. Under these conditions, the pressure between the two would have to be such as to score the surface of the blanks 20. Thereafter, a coating of resist could be rolled over the blanks 20 to protect against the action of acid all areas save the scored areas, and finally the blanks 20 etched to form the markings 22 thereon.

Also, in either embodiment, the relief reproductions of the markings on the die could be inked with a suitable resist and the blanks rolled over the die, during which operation the resist would be deposited on the surface of the blanks. Then when the blanks are etched, the markings 22 will appear in relief along the groove 21.

In addition, in either embodiment, the reproductions on the die could be inked with an opaque ink and the blanks after being coated with a light sensitive emulsion rolled against the die, during which operation the ink would be deposited on the sensitized surface of the blanks. Then the coating could be developed, the inked areas and the underlying areas of the coating removed and the blanks etched to form the markings 22 thereon.

The invention also contemplates the use of an intaglio die, and in such case, positives are made from the negatives and these positives used in place of negatives in the above-described arrangements for making the die. When an intaglio die is used, the recessed areas could be filled with a resist ink and the die and blanks brought into engagement during which operation the resist would be deposited on the blanks. Thereafter, the blanks could be etched and the markings would be formed in relief. Alternatively, the recessed areas on the intaglio die could be filled with an opaque ink and the blanks after being coated with a light sensitive emulsion brought into engagement therewith during which operation the ink would be deposited on the coating on the blanks. Thereafter, the coating could be developed, the blanks washed to remove the ink and the underlying areas of coating on the blanks, and finally the blanks etched to form the markings in intaglio.

In the event it is desired to provide greater traction between the die and the blanks than that provided by the relief reproductions on the die, whether it be either the flat die or the roller die in order to prevent slippage, such additional traction may be provided by forming on each side of the copy a narrow row of spaced angularly disposed non-light reflecting lines 47. Such lines, of course, will show up as transparent lines on the negative and as lines 48 in relief on the die 23 where they will serve as racks. In such cases, the lines on the copy will be spaced so that the distance between the racks formed thereby on the die is greater than the length of the finished drum. When such traction is provided, the drum blanks 20 are made oversize in length so that the ends thereof will be engaged by the racks on the die, and then cut to the desired length either before or after the etching out of the markings on the drums.

In addition, the invention contemplates the use of a film in the making of a die wherein the reproductions of the markings are created mechanically as by scribing them through the emulsion instead of photographing them from a copy.

Having thus described my invention, what I claim is:

1. In the method of producing a range drum having a spiral groove with markings along one edge thereof, the steps which include providing a blank machine finished to substantially the exact diameter required, photoengraving the markings on said blank, and then mechanically forming the groove on the blank.

2. In the method of producing the requisite markings on a range drum or the like, the steps which include creating a flat die having in relief reproductions of said markings, providing said die with a friction creating rack along a portion of its length, preparing a drum blank machine finished to substantially the exact diameter required, coating said blank with an acid resist, mounting said blank above said die, bringing said blank into engagement with said die adjacent one end thereof, moving said die beneath said coated blank to cause the relief reproductions thereon to displace like areas of the coating on the blank, removing said blank from above said die and then subjecting the blank to the action of acid to etch the areas thereof underlying the displaced areas of the coating.

3. In the method of producing the requisite markings on a range drum or the like, the steps which include creating a die having reproductions in relief of said markings, preparing a drum blank machine finished to substantially the exact diameter required, coating said blank with an acid resist, bringing said blank into engagement with said die, causing relative movement between said blank and said die under the influence of means which prevents slippage therebetween to cause the relief reproductions on the die to displace like areas of the coating on the blank, and thereafter subjecting the blank to the action of acid to etch the areas thereof underlying the displaced areas of the coating.

4. In the method of producing the requisite markings on a range drum or the like, the steps which include creating a die having reproductions in relief of said markings, preparing a drum blank machine finished to substantially the exact diameter required, coating said blank with a resist, bringing said blank into engagement with said die, causing relative movement between said blank and said die to cause the relief reproductions on the die to displace like areas of the coating on the blank, and thereafter subjecting the blank to the action of an etchant to etch the areas thereof underlying the displaced areas of the coating.

5. In the method of producing the requisite markings on a range drum or the like, the steps which include creating a die having reproductions in relief of said markings, preparing a drum blank machine finished to substantially the exact diameter required, coating said blank with a resist, bringing said blank into engagement with said die, causing relative movement between said blank and said die to cause the relief reproductions on the die to displace like areas of the coating on the blank, subjecting the blank to the action of an etchant to etch the areas thereof underlying the displaced areas of the coating, and then mechanically forming the groove on the blank.

OWEN R. HUGGINS.